F. CONRAD.
ELECTRICAL SYSTEM.
APPLICATION FILED APR. 2, 1913.
1,234,876.
Patented July 31, 1917.
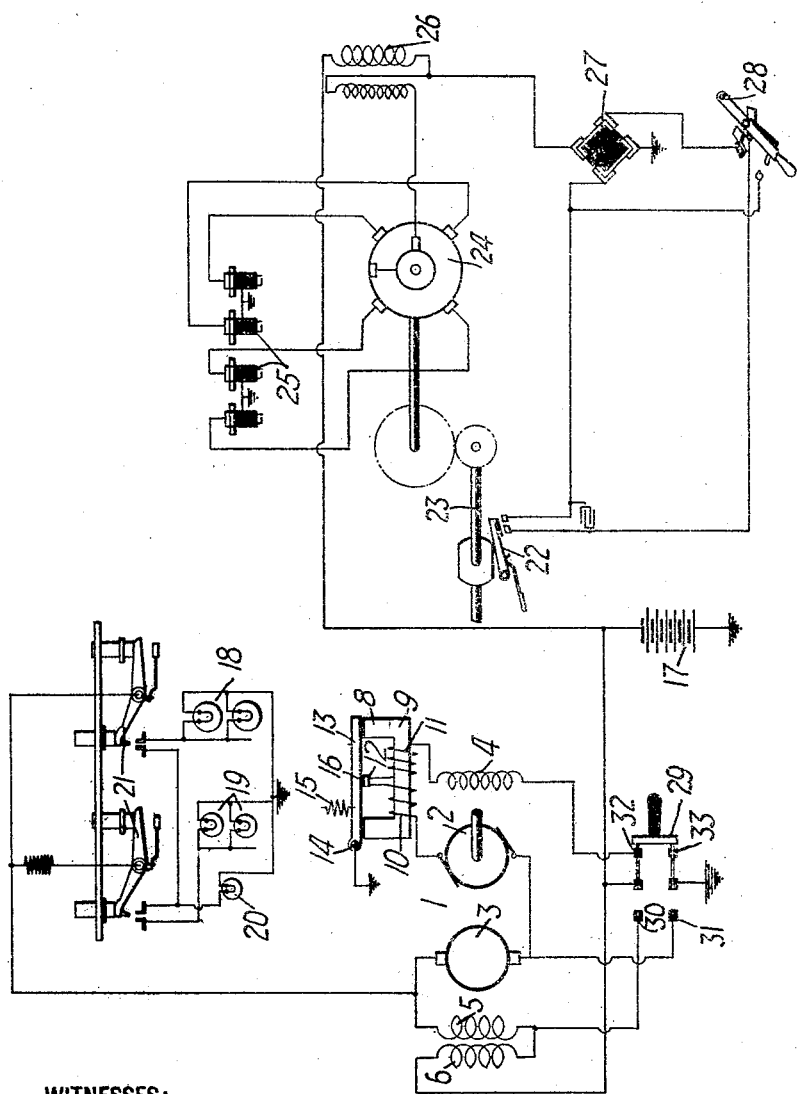
WITNESSES:
INVENTOR
Frank Conrad
BY
Wesley G. Carr
ATTORNEY

UNITED STATES PATENT OFFICE.

FRANK CONRAD OF SWISSVALE, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,234,876.  Specification of Letters Patent.  Patented July 31, 1917.

Application filed April 2, 1913. Serial No. 758,309.

*To all whom it may concern:*

Be it known that I, FRANK CONRAD, a citizen of the United States, and a resident of Swissvale, in the county of Allegheny and State of Pennsylvania, have invented a new and useful Improvement in Electrical Systems, of which the following is a specification.

My invention relates to such electrical systems as may be employed in connection with automobiles or other motor vehicles for starting gas engines and for charging storage batteries.

My invention has for one of its objects to provide a dynamo-electric machine in which are combined a generator and motor which perform their respective electrical functions but are mechanically constructed to form a unitary structure.

A second object of my invention is to provide a system of the above indicated character in which a dynamo-electric machine constructed in accordance with my invention may be utilized to start a gas engine and to furnish current for ignition and lighting and for charging a secondary battery.

I propose to employ a dynamo-electric machine having one armature provided with two separate windings, each of which is connected to its respective commutator. The field windings of the machine are common to the armature windings. I also provide means for controlling the circuit connections whereby the armature windings may be connected in various relations, as later described.

The single figure of the drawing is a diagrammatic view of circuits and apparatus embodying my invention.

Referring to the drawing, a dynamo-electric machine 1 is provided with a single armature core having two windings 2 and 3 that are electrically independent. The winding 2 is adapted to be connected in circuit when the dynamo-electric machine operates as a generator. The winding 3 is adapted to be connected in circuit when the dynamo-electric machine operates either as a motor or as a generator. The voltage generated by the winding 3, when the dynamo-electric machine operates as a generator, is a small percentage of that generated by the winding 2. The windings 2 and 3 may be placed in the same armature slots and be connected to separate commutators, as diagrammatically shown in the drawings. The field windings of the machine comprise a shunt winding 4 and a series winding 5, acting to assist each other, and a differential series winding 6. The several field windings are common to the two armature windings 2 and 3. A cutout or automatic switch 8 controls the battery charging circuit of the dynamo-electric machine.

The cutout comprises a core member 9 on which are wound coils 10 and 11 that are each connected to a contact member 12. An armature 13, which has a pivotal support at 14 and is normally held upward by a spring 15, is provided with a contact member 16 to engage the contact member 12.

The system comprises a storage battery 17 which furnishes current for a lighting system and an ignition system. The lighting system comprises the head lights 18, side lights 19 and the tail light 20 of an automobile. The several lamp circuits are controlled by snap switches 21. The ignition system comprises an interrupter 22 that is mounted on the armature shaft 23 of the dynamo-electric machine, a distributer 24, spark plugs 25, an induction coil 26, a plug switch 27 and a starting switch 28. The details of the lighting and ignition systems form the subjects-matter of separate applications and a description of them is considered unnecessary to an understanding of my present invention. The connections of the various circuits are controlled by a double pole, double throw switch comprising a movable member 29 which engages contact members 30 and 31 or contact members 32 and 33, according to its position.

It may be assumed that the dynamo electric machine is operatively connected to a gas engine (not shown) of an automobile and that the various parts are in their inoperative positions. When it is desired to start the engine, the switch member 29 is thrown to the left, or starting position, to engage the contact members 30 and 31. A circuit is completed from the ungrounded side of the battery 17, through the switch 29, contact member 30, field winding 5, armature winding 3, contact member 31 and switch member 29 to ground. It will be noted that the differential winding 6 has been shunted by the connections just described and that the series field winding 5 is unopposed. The armature winding 3 and the series field winding 5 then operate as a series motor to start the engine. While the winding 3 generates only a small voltage compared with that of the battery, it is enabled to operate at battery voltage because of the drop in potential in the brushes and the strengthening of the field by shunting the differential winding 6.

When the engine starts under its own power, the operator throws the switch member 29 to the right, or running position, to engage the contact members 32 and 33. The armature windings 2 and 3 are then in series for generator operation and current flows through a circuit comprising the armature winding 3, the armature winding 2, coils 10 and 11, shunt field winding 4, contact member 32, switch member 29, the series field windings 6 and 5 to the armature winding 3. As the engine speed increases, the generator voltage reaches a value at which the coils 10 and 11 are sufficiently energized to draw the armature 13 downwardly to effect the engagement of the contact members 12 and 16 and complete a circuit for charging the battery 17. Current flows from the ungrounded side of the battery 17 through the field windings 6 and 5, armature windings 3 and 2, coil 10, contact members 12 and 16, armature 13, to ground and back to the battery 17. The combined voltage of the armature windings 2 and 3 is sufficient to charge the battery 17. The generator voltage is regulated by the differential field winding 6 so that it never becomes excessive at any speed of the generator. The charging operation will continue until the battery is charged or until the generator voltage falls below that of the battery.

When the battery voltage exceeds that of the generator, current flows in a reverse direction in the charging circuit of which the coil 10 is a part. The coil 10 then opposes the coil 11 and, as a result, the armature 13 is released and drawn upwardly by the spring 15 to separate the contact members 12 and 16. The separation of the charging circuit is broken by the contact members 12 and 16 and the cutout 8 will not operate to close the charging circuit until the generator voltage has again reached the predetermined value at which the cutout operates. The generator is thus protected against a reversal of current in its field windings and the consequent demagnetization of its field magnets. During the charging operation, the lighting and ignition systems are supplied with current from the generator and at other times they are supplied from the battery.

By the employment of a single machine having the combined functions of a motor and a generator, I am enabled to provide a system having a smaller aggregate weight than one in which separate machines are employed. The various parts of the system may be compactly and conveniently arranged. The system operates automatically, after the controlling switch has been placed in the running position, to regulate the generator voltage and to prevent a discharge of the battery back through the generator.

It will be understood that such modifications may be made without departing from the spirit of my invention as fall within the limits of the appended claims.

I claim as my invention:

1. The combination with a dynamo-electric machine having a plurality of armature windings and a plurality of field windings common to said armature windings, of means for rendering one of said armature windings ineffective and for short circuiting one of said field windings when said dynamo-electric machine is operated as a motor and for connecting said armature windings in series for operating said dynamo-electric machine as a generator.

2. The combination with a dynamo-electric machine having an armature provided with two independent windings, a main circuit for said dynamo-electric machine, electrical connections between said windings and said circuit, and means for controlling said connections whereby only one of said windings may be connected in circuit to operate said dynamo-electric machine as a motor and whereby both of said windings may be connected in series to operate as a generator.

3. The combination with a dynamo-electric machine having a plurality of field-magnet windings, one of which opposes the others and having an armature provided with two independent windings, of means for short-circuiting said opposing winding and connecting a single armature winding in circuit when the dynamo-electric machine operates as a motor and for removing said short circuit and connecting said armature windings in series when said dynamo-electric machine operates as a generator.

4. The combination with a dynamo-electric machine having field-magnet windings and an armature provided with two independent windings, and means for controlling the connections of said windings having one position in which all of said windings are effective and a second position in which a single armature winding is connected in circuit and, at the same time, the effective ampere-turns of said field-magnet windings are increased over that obtaining for the first position.

5. The combination with a dynamo-electric machine having a series field winding in two parts wound to oppose each other and an armature having two independent windings, of means for controlling the electrical connections of said windings whereby all of said windings may be connected in circuit or a single armature winding may be connected in circuit and, at the same time, one part of said series field winding is rendered ineffective.

6. The combination with a dynamo-electric machine having field windings comprising a differential winding and an armature having two independent windings, of means for controlling the electrical connections of said windings whereby all of said windings may be rendered effective or said differential field winding is rendered ineffective when a single armature winding is connected in circuit.

7. The combination with a compound wound dynamo-electric machine having a plurality of armature windings and field windings comprising a differential winding, said field windings being common to said armature windings, of electrical connections between said several windings, and means for controlling said connections having one position in which a single armature winding is in circuit and the differential field winding is ineffective and a second position in which said differential winding is effective and said armature windings are connected in series.

8. The combination with a dynamo-electric machine having a pair of independent armature windings and shunt and series field-magnet windings, of means for rendering one of said armature windings and the shunt field-magnet winding ineffective when the dynamo-electric machine is operated as a motor, and for rendering all of said windings effective for generator operation.

9. The combination with a pair of dynamo-electric machine armature windings, an accumulator, and a current-consuming device, of means for connecting a single armature winding in circuit with said accumulator for operation as a motor and both of said armature windings in circuit with said device when the accumulator is receiving energy from said windings.

10. The combination with a pair of dynamo-electric machine armature windings and an accumulator, of means for connecting one only of said windings in circuit with said accumulator for motor operation and for connecting both of said windings in circuit with said accumulator for generator operation to supply energy to said accumulator.

11. The combination with a dynamo-electric machine having a plurality of independent armature windings, of a storage battery, means for connecting said battery in circuit with one of said windings for motor operation, and means for connecting another of said windings in circuit with said first winding and said battery at a predetermined voltage.

12. The combination with a dynamo-electric machine having two independent armature windings, a storage battery and a current-consuming device, of means comprising a manually operable switch for connecting one of said windings in circuit with said battery and means for connecting the other of said windings in circuit with said battery at a predetermined voltage.

13. The combination with a dynamo-electric machine adapted to operate either as a motor or as a generator and having two independent armature windings, of means for connecting one only of said windings in circuit for motor operation and for connecting both of said windings in series relation for generator operation.

14. The combination with a dynamo-electric machine comprising a plurality of field magnet windings and an armature having two independent windings, of means for connecting said windings for the operation of said machine either as a series-wound motor or as a compound-wound generator.

15. The combination with a dynamo-electric machine adapted to operate either as a motor or as a generator, and having a plurality of armature windings and a plurality of field magnet windings, of means for connecting all of said windings in circuit for generator operation and for rendering one of said armature windings and one of said field magnet windings inoperative for motor operation.

16. The combination with a dynamo-electric machine having a plurality of field magnet windings and an armature provided with two independent windings, of means for connecting a single armature winding and a single field-magnet winding in circuit for operation as a motor and for connecting said armature windings in series relation for operation as a generator.

17. The combination with a dynamo-electric machine adapted to operate either as a motor or as a generator and having a plurality of armature windings and series and shunt field-magnet windings that are common to said armature windings, of means for connecting all of said windings in circuit for generator operation and for rendering said shunt field-magnet winding inoperative for motor operation.

18. The combination with a dynamo-electric machine having an armature provided with two independent windings, and having series and shunt field-magnet windings, of means for connecting a single armature winding in series relation with said series field-magnet winding for operating said machine as a series-wound motor and for connecting said armature windings and said field-magnet windings in circuit for operating said machine as a compound-wound generator.

19. The combination with a dynamo-electric machine adapted to operate either as a generator or as a motor and having a plurality of independent armature windings and opposing series and shunt field windings, of means for connecting all of said windings in circuit for generator operation and for rendering one of said armature windings and said shunt field winding inoperative for motor operation.

20. The combination with a dynamo-electric machine having two series field-magnet windings, a shunt field-magnet winding and a pair of independent armature windings, of means for connecting a single armature winding and a single field-magnet winding in series relation for the operation of said machine as a motor and for connecting all of said field-magnet windings in circuit and said armature windings in series relation for operation as a generator.

In testimony whereof, I have hereunto subscribed my name this 29th day of March, 1913.

FRANK CONRAD.

Witnesses:
R. E. CULLINGS.
B. B. HINES.